United States Patent
Hosseini et al.

(10) Patent No.: US 10,966,240 B2
(45) Date of Patent: Mar. 30, 2021

(54) UPLINK PREEMPTION INDICATION MANAGEMENT

(71) Applicant: QUALCOMM Incorporated, San Diego, CA (US)

(72) Inventors: Seyedkianoush Hosseini, San Diego, CA (US); Jing Jiang, San Diego, CA (US); Chih-Ping Li, San Diego, CA (US); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 172 days.

(21) Appl. No.: 16/381,696

(22) Filed: Apr. 11, 2019

(65) Prior Publication Data

US 2019/0320458 A1 Oct. 17, 2019

Related U.S. Application Data

(60) Provisional application No. 62/657,483, filed on Apr. 13, 2018.

(51) Int. Cl.
*H04W 4/00* (2018.01)
*H04W 72/14* (2009.01)

(52) U.S. Cl.
CPC .................. *H04W 72/14* (2013.01)

(58) Field of Classification Search
CPC ....................................................... H04W 72/14
USPC ................................ 370/329–330, 335–345
See application file for complete search history.

(56) References Cited

U.S. PATENT DOCUMENTS

| | | | |
|---|---|---|---|
| 2019/0349960 A1* | 11/2019 | Li | H04W 72/1242 |
| 2020/0015119 A1* | 1/2020 | Takeda | H04W 28/04 |
| 2020/0128558 A1* | 4/2020 | Lu | H04L 5/0055 |
| 2020/0195386 A1* | 6/2020 | Marinier | H04L 1/1845 |

FOREIGN PATENT DOCUMENTS

| | | |
|---|---|---|
| EP | 3185450 A1 | 6/2017 |
| EP | 3197222 A1 | 7/2017 |
| EP | 3253158 A1 | 12/2017 |

OTHER PUBLICATIONS

Intel Corporation: "Downlink URLLC Transmission and Multiplexing with eMBB", 3GPP Draft; R1-1612003, Intel—URLLC DL MUX, 3rd Generation Partnership Project (3GPP), Mobile Competence Centre; 650, Route Des Lucioles ; F-06921 Sophia-Antipolis Cedex ; France, vol. RAN WG1, No. Reno, USA; Nov. 14, 2016-Nov. 18, 2016, Nov. 13, 2016 (Nov. 13, 2016), XP051175967, 9 Pages, Retrieved from the Internet: URL:http://www.3gpp.org/ftp/Meetings_3GPP_SYNC/RAN1/Docs/ [retrieved on Nov. 13, 2016].
International Search Report and Written Opinion—PCT/US2019/027156—ISA/EPO—dated Jul. 29, 2017.

* cited by examiner

*Primary Examiner* — Thai D Hoang
(74) *Attorney, Agent, or Firm* — Shankar Krithivasan

(57) ABSTRACT

Various aspects of the present disclosure generally relate to wireless communication. In some aspects, a user equipment may receive a preemption indication identifying at least one symbol of a grant for preemption. The user equipment may selectively preempt the at least one symbol of the grant based at least in part on a receive time of the preemption indication, a processing time threshold, and a preemption time of the at least one symbol of the grant. Numerous other aspects are provided.

30 Claims, 11 Drawing Sheets

UPLINK PREEMPTION INDICATION MANAGEMENT

CROSS-REFERENCE TO RELATED APPLICATIONS UNDER 35 U.S.C. § 119

This application claims priority to U.S. Provisional Patent Application No. 62/657,483, filed on Apr. 13, 2018, entitled "TECHNIQUES AND APPARATUSES FOR UPLINK PREEMPTION INDICATION MANAGEMENT," which is hereby expressly incorporated by reference herein.

FIELD OF THE DISCLOSURE

Aspects of the present disclosure generally relate to wireless communication, and more particularly to techniques and apparatuses for uplink preemption indication management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a preemption indication identifying at least one symbol of a grant for preemption. The method may include selectively preempting the at least one symbol of the grant based at least in part on a receive time of the preemption indication, a processing time threshold, and a preemption time of the at least one symbol of the grant.

In some aspects, a user equipment for wireless communication may include memory and one or more processors operatively coupled to the memory. The memory and the one or more processors may be configured to receive a preemption indication identifying at least one symbol of a grant for preemption. The memory and the one or more processors may be configured to selectively preempt the at least one symbol of the grant based at least in part on a receive time of the preemption indication, a processing time threshold, and a preemption time of the at least one symbol of the grant.

In some aspects, a non-transitory computer-readable medium may store one or more instructions for wireless communication. The one or more instructions, when executed by one or more processors of a user equipment, may cause the one or more processors to receive a preemption indication identifying at least one symbol of a grant for preemption. The one or more instructions, when executed by the one or more processors of the user equipment, may cause the one or more processors to selectively preempt the at least one symbol of the grant based at least in part on a receive time of the preemption indication, a processing time threshold, and a preemption time of the at least one symbol of the grant.

In some aspects, an apparatus for wireless communication may include means for receiving a preemption indication identifying at least one symbol of a grant for preemption. The apparatus may include means for selectively preempting the at least one symbol of the grant based at least in part on a receive time of the preemption indication, a processing time threshold, and a preemption time of the at least one symbol of the grant.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
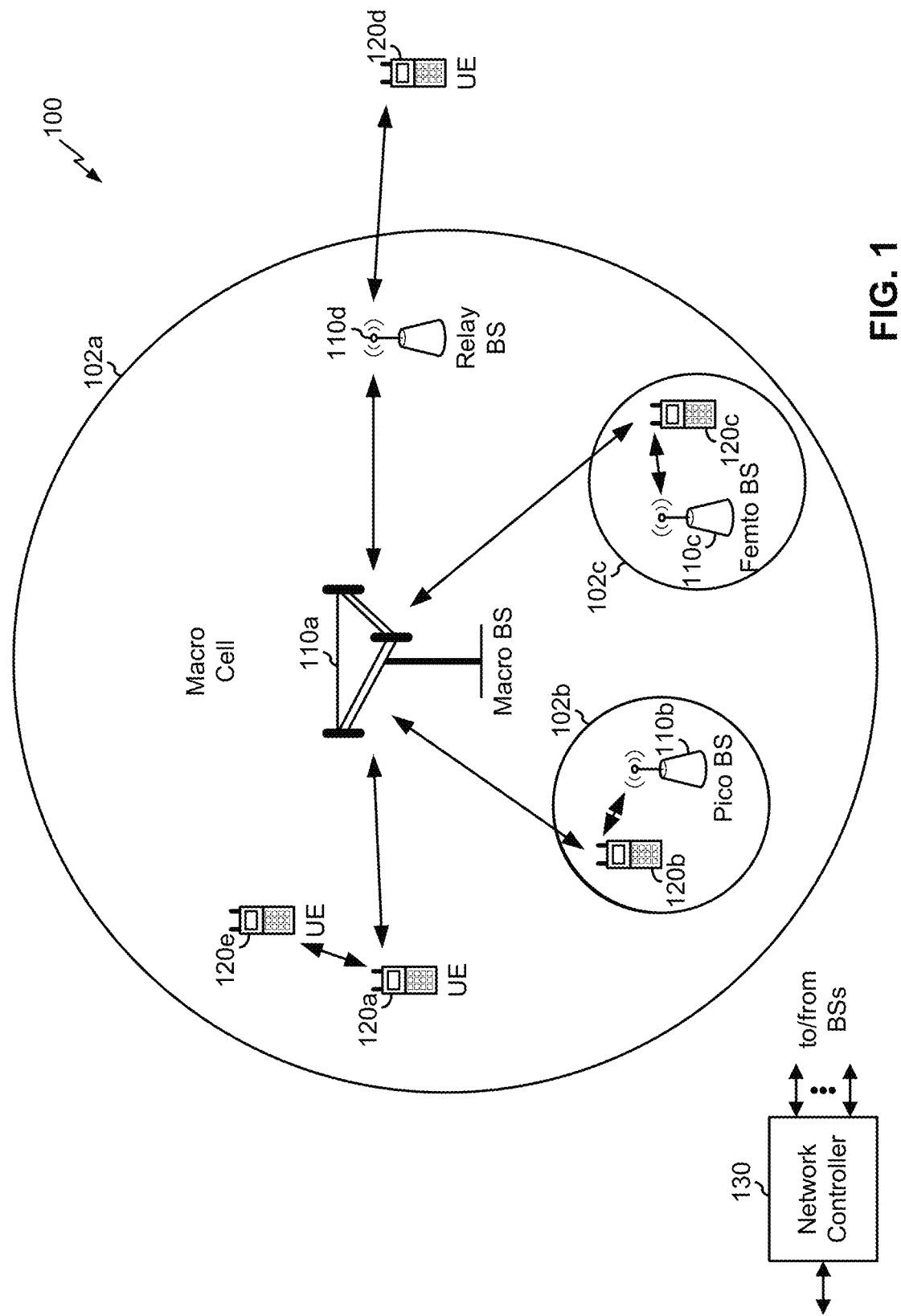
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
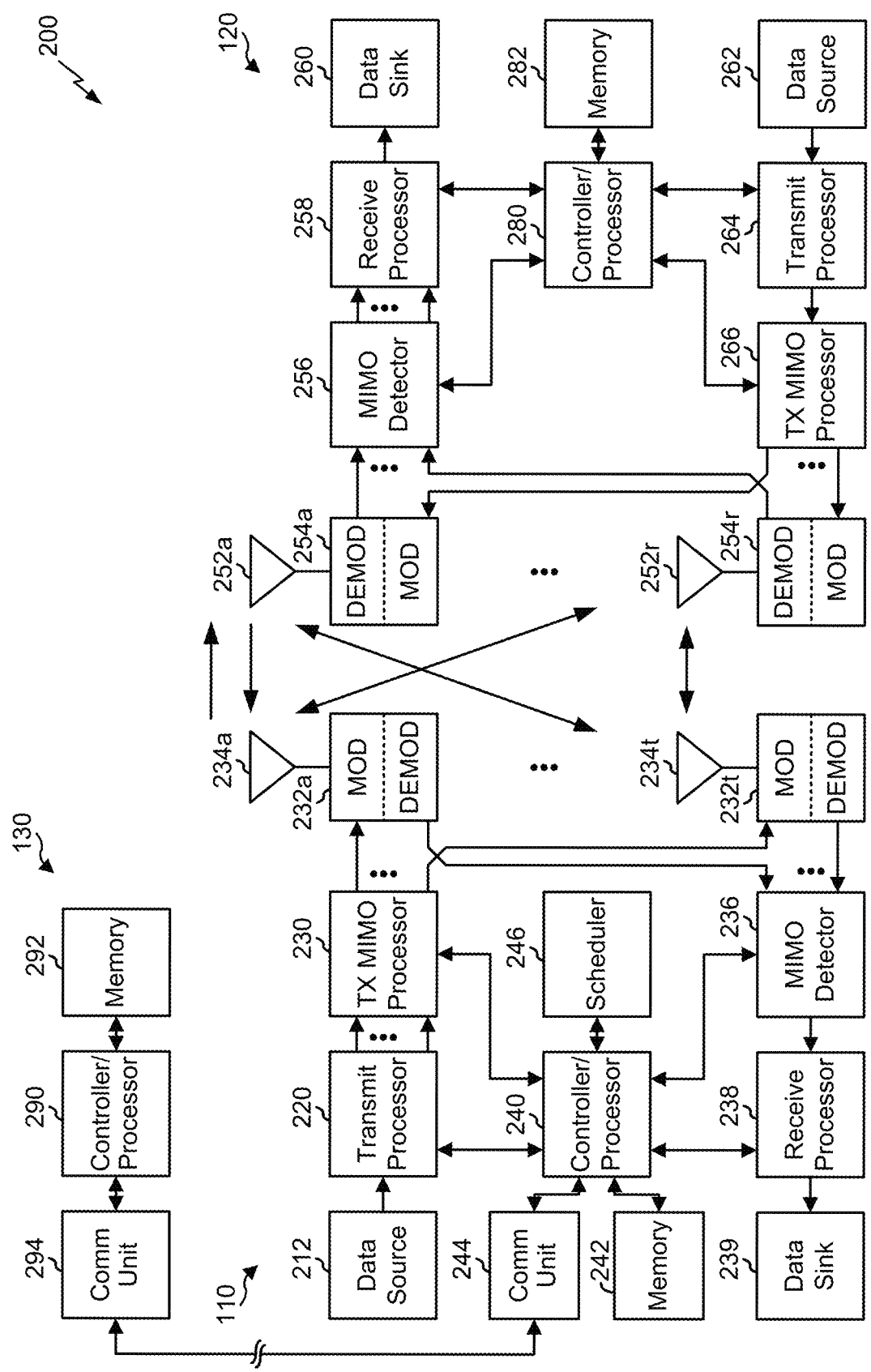
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with uplink preemption indication management, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a preemption indication identifying at least one symbol of a grant for preemption; means for selectively preempting the at least one symbol of the grant based at least in part on a receive time of the preemption indication, a processing time threshold, and a preemption time of the at least one symbol of the grant; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
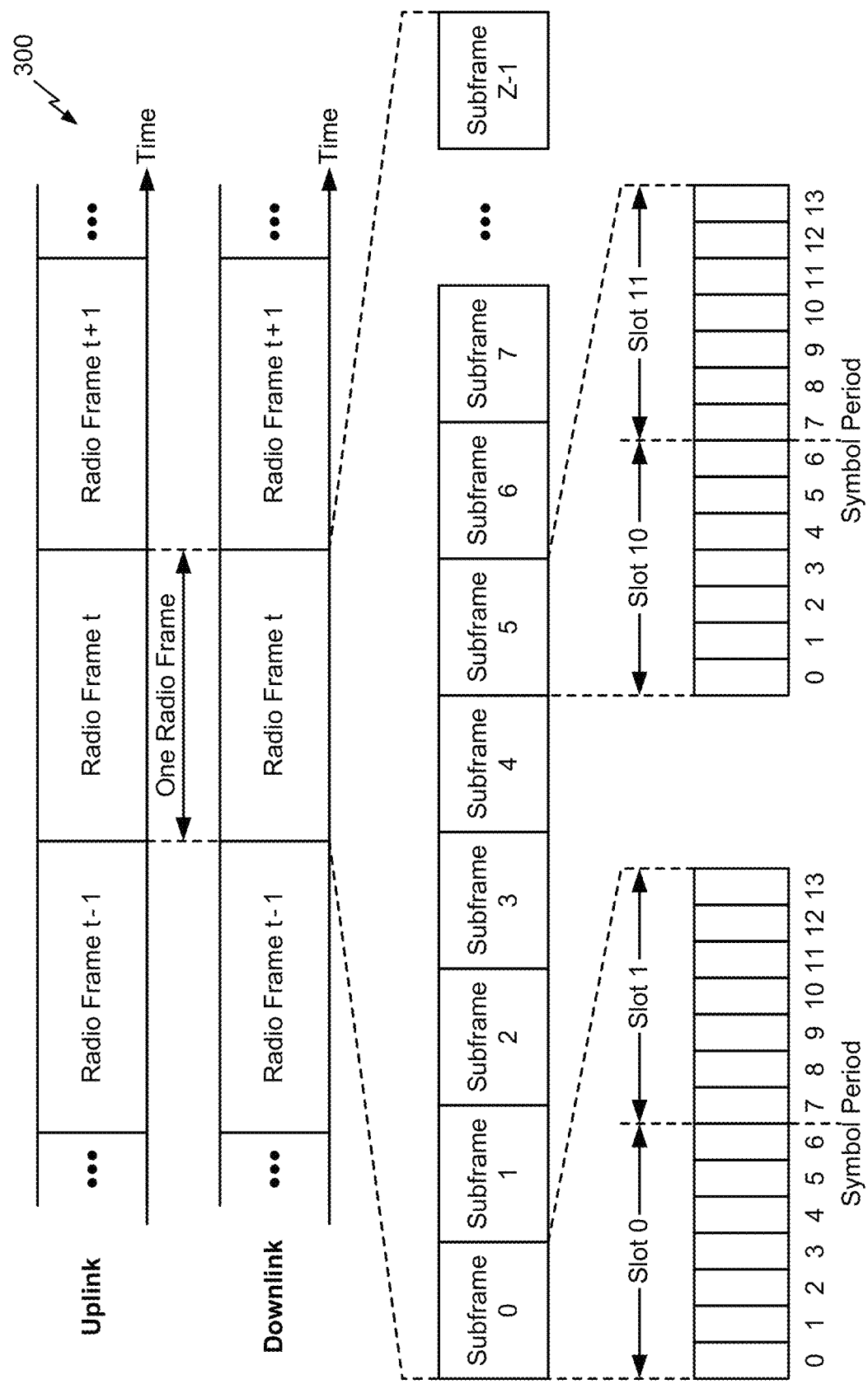
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
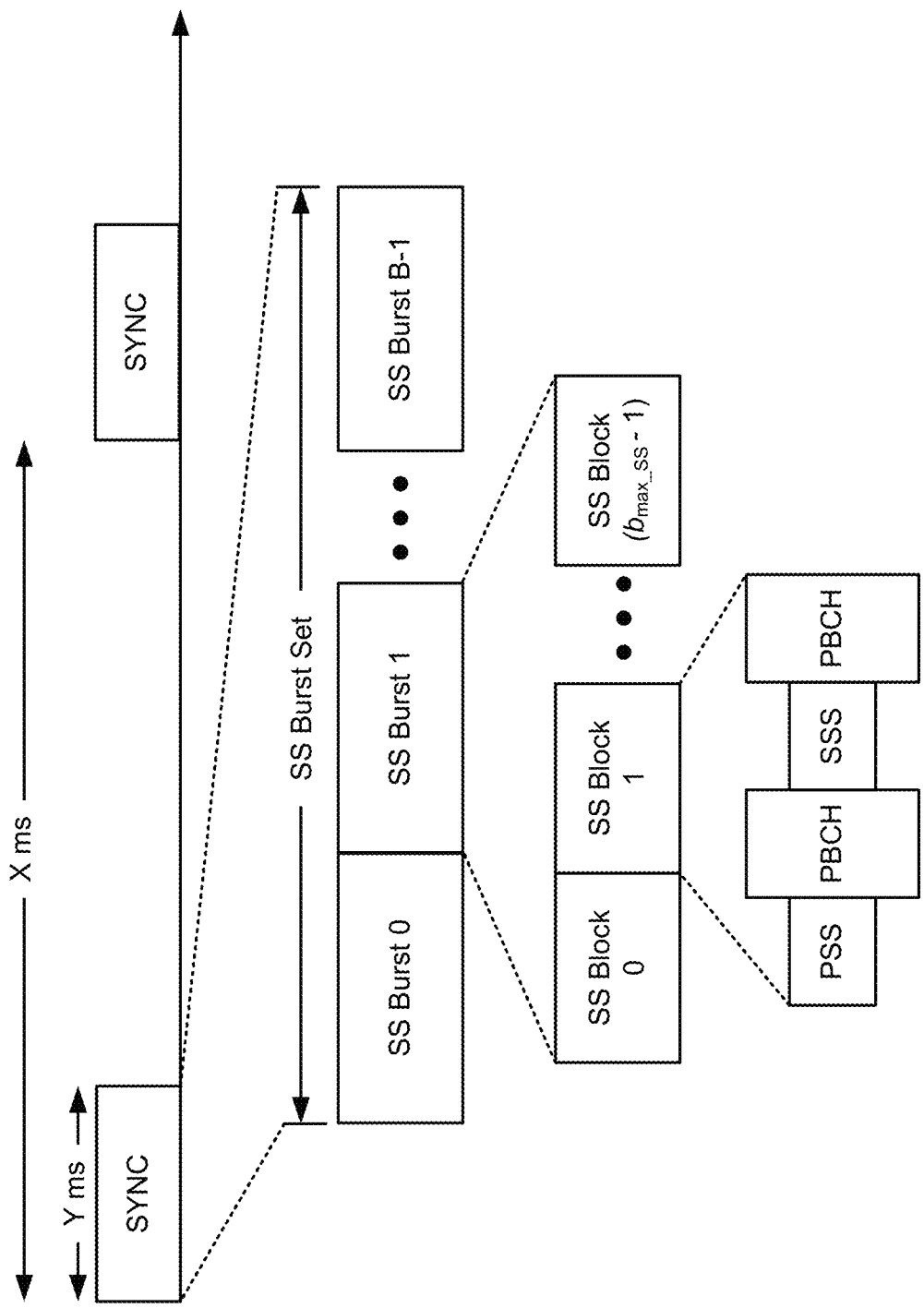
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block (bmax SS-1), where bmax SS-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
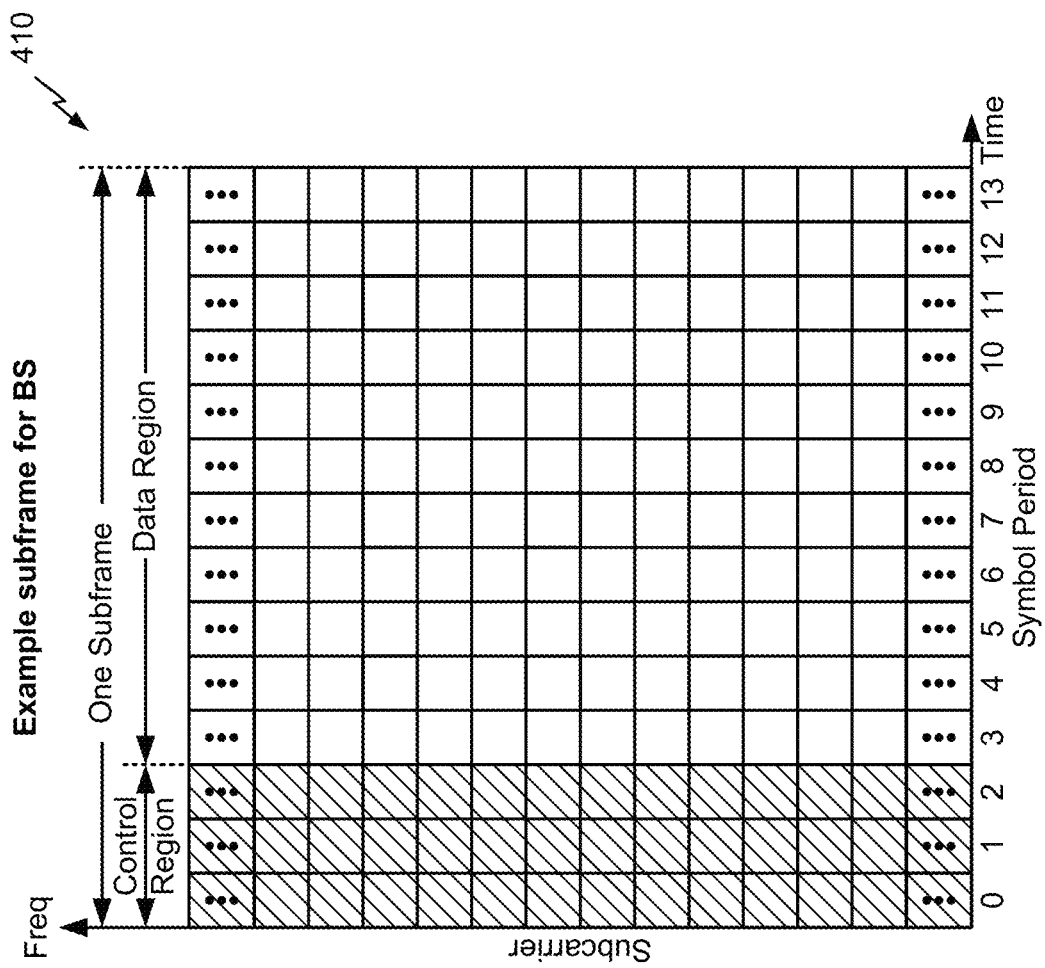
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
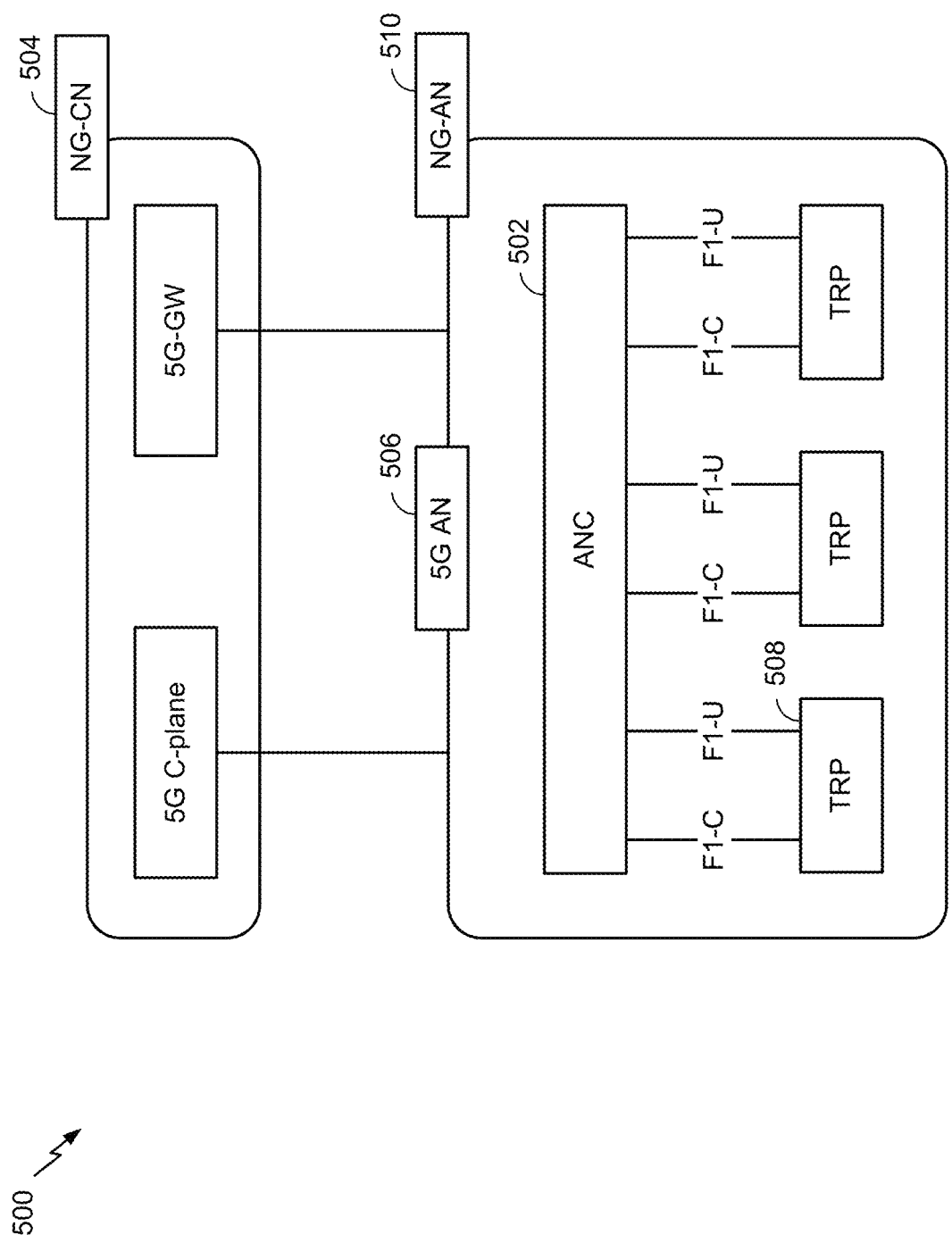
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
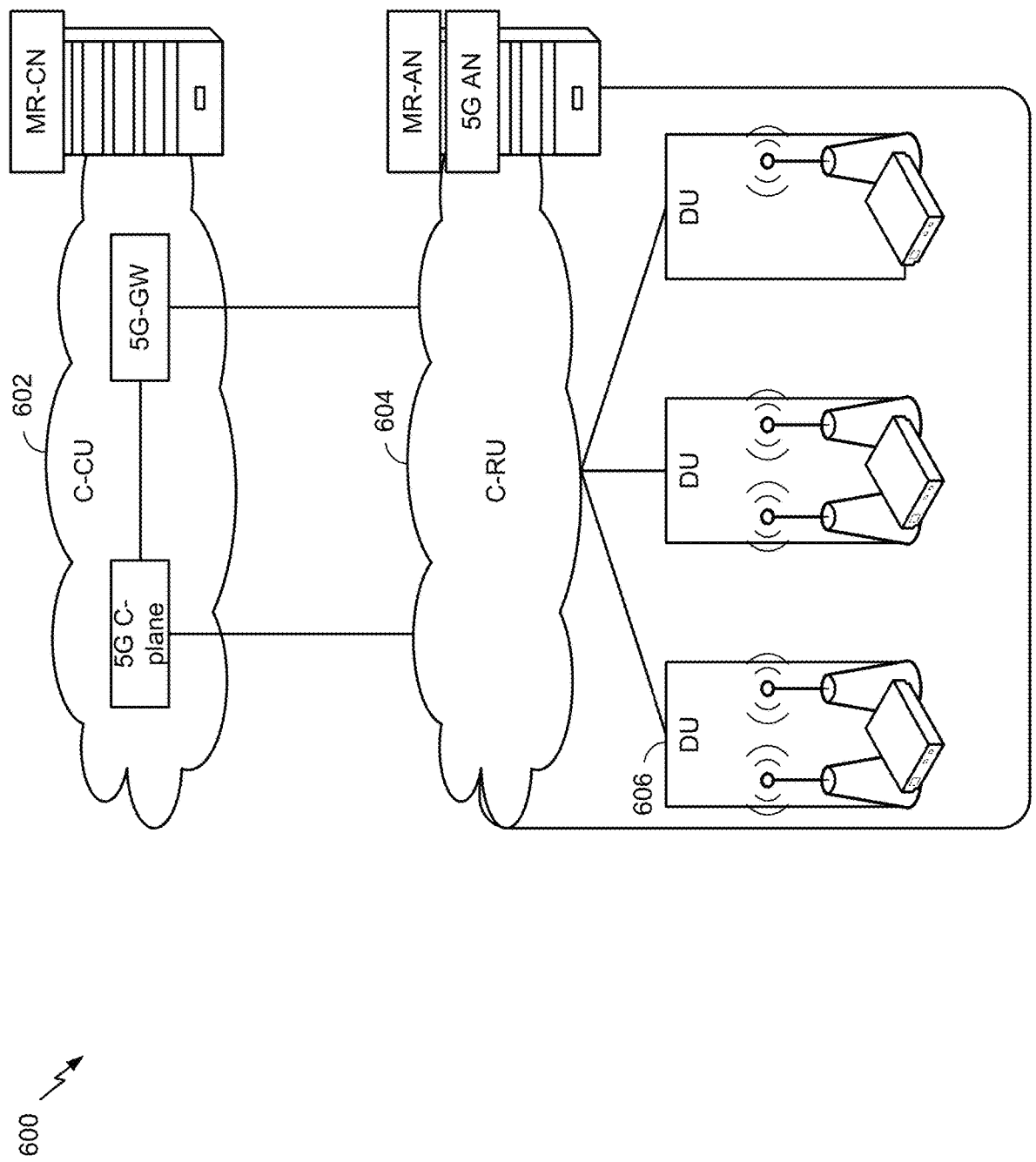
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as 5G or NR, a BS may concurrently communicate with UEs associated with different use cases. For example, the BS may concurrently enable an enhanced mobile broadband (eMBB) service, an ultra-reliable low latency communication (URLLC) service, and/or the like. However, different services may be associated with different scheduling timelines. For example, for the URLLC service, a UE may be associated with a latency requirement of approximately 1 millisecond, but for the eMBB service, the UE may be associated with a greater latency than for the URLLC service.

As a result, a resource may be allocated, at an initial time, for an eMBB transmission, but may, at a subsequent time, need to be reallocated for a URLLC transmission to satisfy the latency requirement of the URLLC service. In this case, if the UE transmits a first transmission for eMBB concurrently with a second transmission for URLLC (e.g., by another UE, by the same UE, and/or the like), the first transmission may interfere with the second transmission. To avoid interference and to effectuate the reallocation of, for example, symbols of an uplink grant from an eMBB service to a URLLC service, a BS may transmit a preemption indication to a UE. For example, the BS may transmit the preemption indication to indicate that a symbol, that was allocated for eMBB, is to be preempted for use in URLLC. However, a delay may occur between the BS determining to reallocate the symbol, the BS transmitting the preemption indication, the UE receiving the preemption indication, and the UE processing the preemption indication to identify the symbol that is to be reallocated.

Some aspects described herein may provide for uplink preemption indication management. For example, the UE may selectively preempt a symbol of an uplink grant based at least in part on a set of timing parameters and decision criteria, such as based at least in part on a receive time of the preemption indication, a processing time threshold for processing the preemption indication, a preemption time of the symbol, and/or the like. In this way, the UE may determine whether to preempt a symbol of an uplink grant, for example, in cases where an amount of time to process the preemption indication does not satisfy the processing time threshold, does satisfy the processing time threshold, and/or the like. In this way, the UE may reduce interference by preempting the symbol, may reduce a utilization of processing resources by avoiding processing when insufficient time is available for processing the preemption indication, and/or the like.

Figure 7:
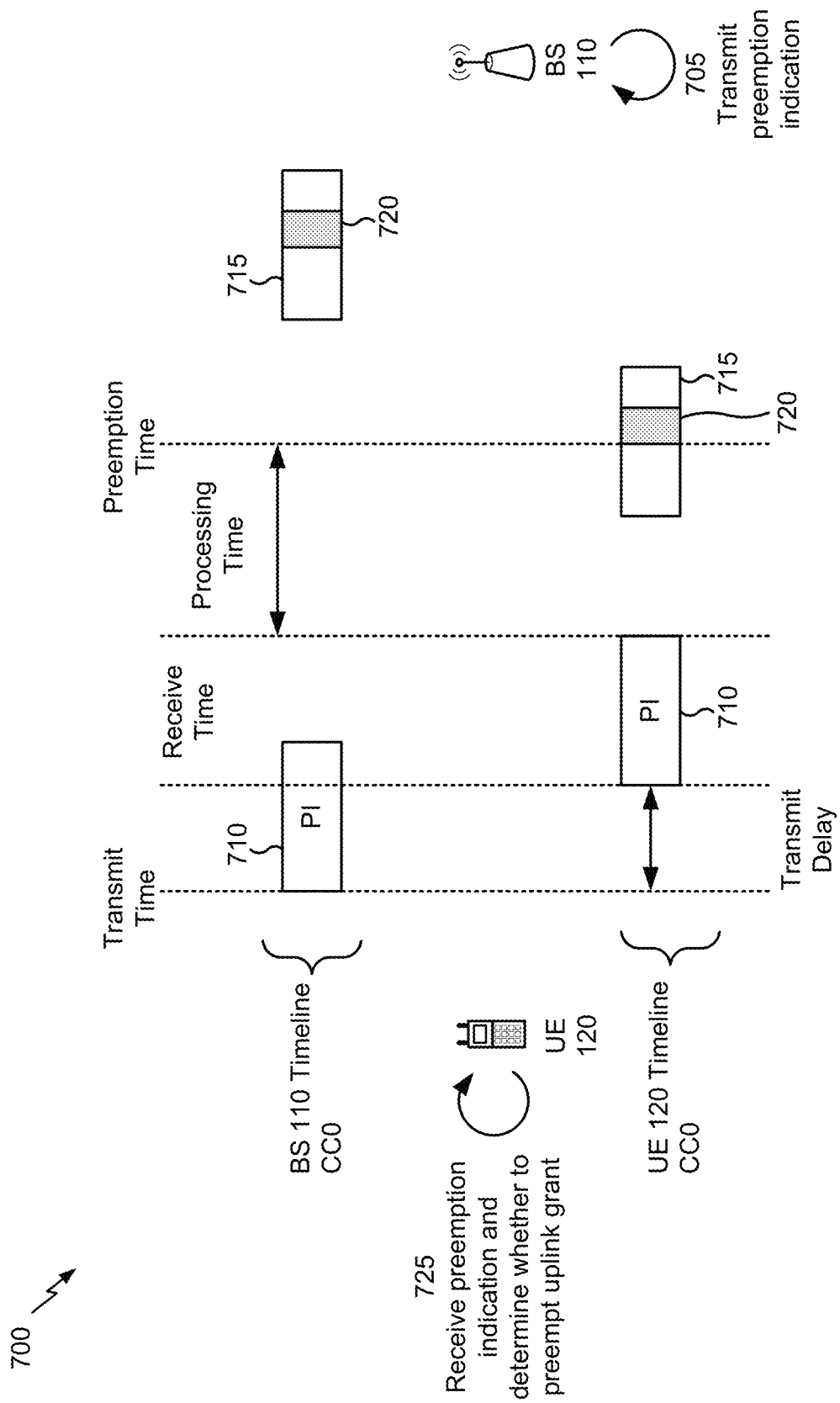
FIG. 7 is a diagram illustrating an example of uplink preemption indication management, in accordance with various aspects of the present disclosure.

FIG. 7 is a diagram illustrating an example 700 of uplink preemption indication management in accordance with various aspects of the present disclosure. As shown in FIG. 7, example 700 may include a BS 110 and a UE 120.

As further shown in FIG. 7, and by reference number 705, BS 110 may transmit a preemption indication. For example, BS 110 may transmit preemption indication (PI) 710 at a particular transmit time, and UE 120 may receive preemption indication 710 at a particular receive time and after a particular transmit delay. In some aspects, the receive time may be defined based at least in part on a first symbol of preemption indication 710 being received, a last symbol of preemption indication 710 being received, and/or the like. In some aspects, preemption indication 710 may be received on a particular component carrier. For example, preemption indication 710 may be received on component carrier CC0 and may relate to an uplink grant 715 associated with component carrier CC0. In this case, preemption indication 710 may include a symbol 720 that is to be preempted. In another example, preemption indication 710 may include another symbol that is to be preempted. For example, preemption indication 710 may include a first symbol that is to be preempted and a second symbol that is to be preempted. In some aspects, the first symbol may be associated with uplink grant 715 and the second symbol may be associated with another uplink grant associated with component carrier CC0.

As further shown in FIG. 7, and by reference number 725, UE 120 may receive the preemption indication, and may selectively preempt symbol 720 of uplink grant 715. For example, UE 120 may determine whether a processing time satisfies a processing time threshold. In this case, the processing time may be an amount of time available between the receive time and the preemption time at which symbol 720 occurs, and the processing time threshold may be an amount of time for UE 120 to process the preemption indication (and apply the preemption indication) based at least in part on a UE capability (e.g., a processing capability).

In some aspects, UE 120 may determine to preempt symbol 720. For example, when an amount of time between the receive time and the preemption time satisfies the processing time threshold, UE 120 may determine to preempt symbol 720. In this way, UE 120 reduces an amount of interference for a URLLC transmission that is to occur using symbol 720. In some aspects, UE 120 may determine not to preempt symbol 720. For example, when the amount of time between the receive time and the preemption time does not satisfy the processing time threshold, UE 120 may determine not to preempt symbol 720. In this way, UE 120 reduces a utilization of processing resources relative to processing the preemption indication for a symbol 720 that occurs before UE 120 will be able to determine to preempt symbol 720.

As indicated above, FIG. 7 is provided as an example. Other examples may differ from what is described with respect to FIG. 7.

Figure 8:
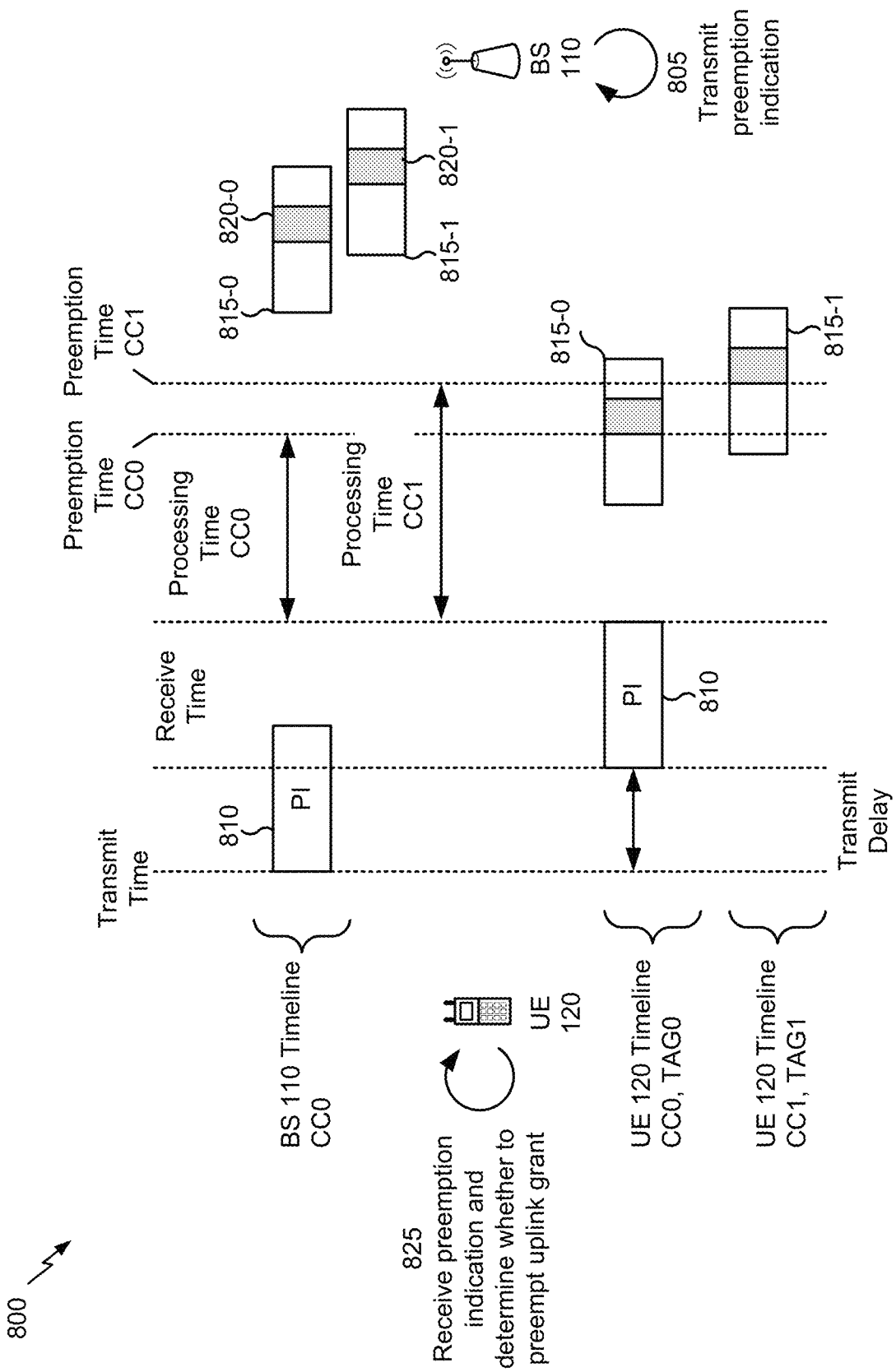
FIG. 8 is a diagram illustrating an example of uplink preemption indication management, in accordance with various aspects of the present disclosure.

FIG. 8 is a diagram illustrating an example 800 of uplink preemption indication management in accordance with various aspects of the present disclosure. As shown in FIG. 8, example 800 may include a BS 110 and a UE 120.

As further shown in FIG. 8, and by reference number 805, BS 110 may transmit a preemption indication. For example, BS 110 may transmit preemption indication (PI) 810 at a particular transmit time, and UE 120 may receive preemption indication 810 at a particular receive time and after a particular transmit delay. In some aspects, preemption indication 810 may be received on a particular component carrier. For example, preemption indication 810 may be received on component carrier CC0 and may relate to a first uplink grant 815-0 associated with component carrier CC0 and timing advance group TAG0 and may relate to a second uplink grant 815-1 associated with component carrier CC1 and timing advance group TAG1. In this case, uplink grant 815-0 may include at least one symbol 820-0 that is to be preempted and uplink grant 815-1 may include at least one symbol 820-1 that is to be preempted.

As further shown in FIG. 8, and by reference number 825, UE 120 may receive the preemption indication, and may selectively preempt symbol 820-0 of uplink grant 815-0, symbol 820-1 of uplink grant 815-1, and/or the like. For example, UE 120 may determine whether a processing time for each uplink grant 815 satisfies a processing time threshold. In some aspects, UE 120 may determine to preempt symbols 820 based at least in part on corresponding processing times. For example, UE 120 may determine whether to preempt symbol 820-0 based at least in part on whether a processing time for component carrier CC0 satisfies the processing time threshold (e.g., based at least in part on the receive time and a first preemption time for symbol 820-0). In this case, UE 120 may determine whether to preempt symbol 820-1 based at least in part on whether a processing time for component carrier CC1 satisfies the processing time threshold (e.g., based at least in part on the receive time and a second preemption time for symbol 820-1). In this way, UE 120 may enable differential treatment of symbols for preemption (e.g., UE 120 may omit symbol 820-0 from preemption, but may still preempt symbol 820-1, which occurs after symbol 820-0), thereby enabling reduced interference relative to omitting all symbols from preemption.

Additionally, or alternatively, UE 120 may determine to preempt symbols 820 based at least in part on a shortest processing time. For example, UE 120 may determine whether to preempt symbols 820-0 and 820-1 based at least in part on whether the processing time for component carrier CC0 satisfies the processing time threshold. In this way, UE 120 maintains a common level of interference across symbols. In another example, when UE 120 receives separate preemption indications for each component carrier (e.g., a first preemption indication on and for component carrier CC0 and applying to symbol 820-0 and a second preemption indication on component carrier CC0 and for component carrier CC1 and applying to symbol 820-1), UE 120 may determine to preempt symbols 820 based at least in part on receive times of corresponding preemption indications and preemption times of symbols 820. Additionally, or alternatively, UE 120 may determine to preempt symbols 820 based at least in part on a receive time of a last received preemption indication and a preemption time of a first symbol 820 of the symbols 820.

As indicated above, FIG. 8 is provided as an example. Other examples may differ from what is described with respect to FIG. 8.

Figure 9:
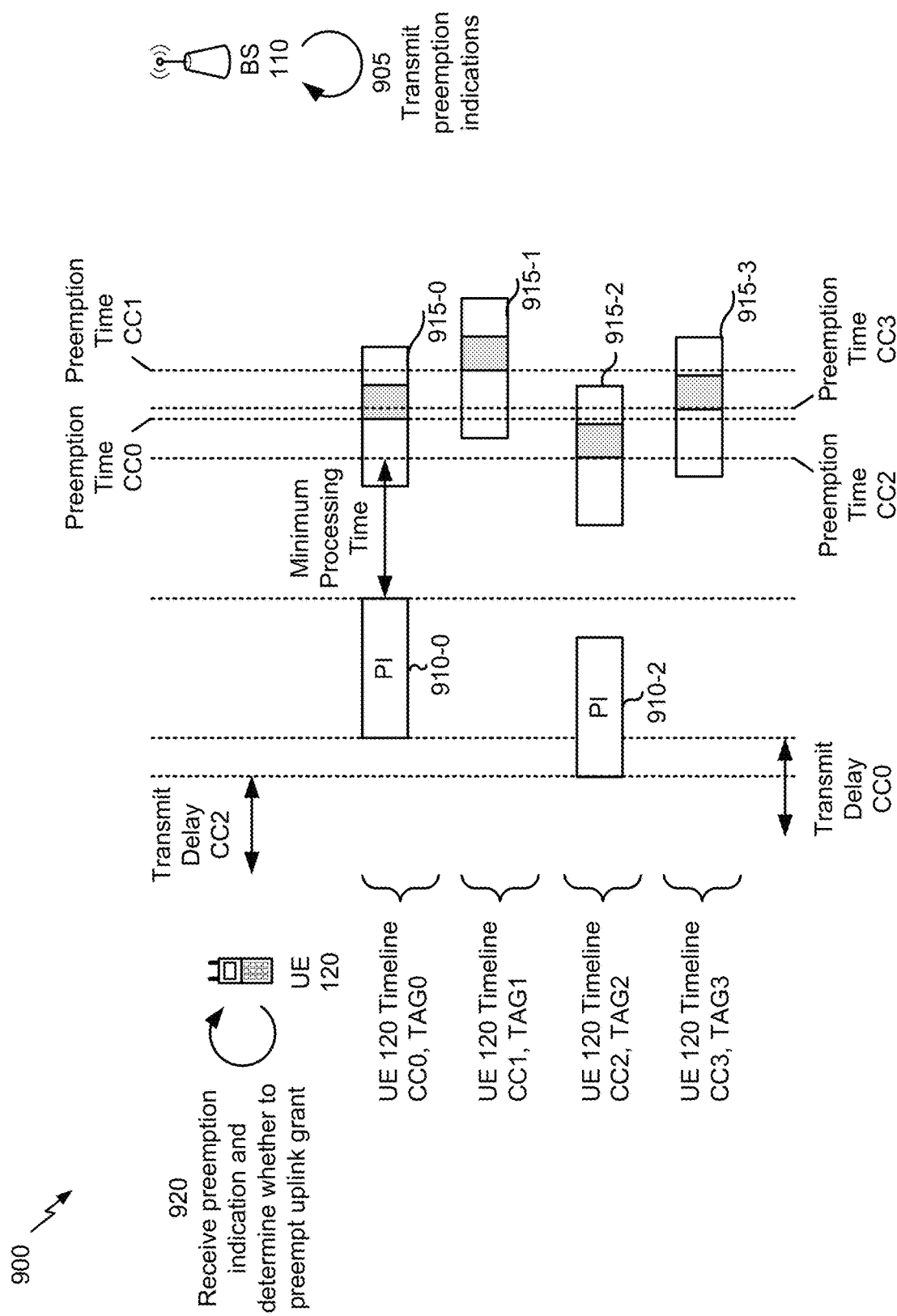
FIG. 9 is a diagram illustrating an example of uplink preemption indication management, in accordance with various aspects of the present disclosure.

FIG. 9 is a diagram illustrating an example 900 of uplink preemption indication management in accordance with various aspects of the present disclosure. As shown in FIG. 9, example 900 may include a BS 110 and a UE 120.

As further shown in FIG. 9, and by reference number 905, BS 110 may transmit a set of preemption indications. For example, BS 110 may transmit preemption indication (PI) 910-0 using component carrier CC0 at a first transmit time, and BS 110 may transmit preemption indication 910-2 using component carrier CC2 at a second transmit time that is earlier than the first transmit time. In this case, preemption indication 910-0 may relate to uplink grant 915-0 of component carrier CC0 and timing advance group TAG0, and may relate to uplink grant 915-1 of component carrier CC/and timing advance group TAG1. Similarly, preemption indication 910-2 may relate to uplink grant 915-2 of component carrier CC2 and timing advance group TAG2, and may relate to uplink grant 915-3 of component carrier CC3 and timing advance group TAGS.

As further shown in FIG. 9, and by reference number 920, UE 120 may receive the preemption indications, and may selectively preempt symbols of uplink grants 915-0 to 915-3. For example, UE 120 may apply a minimum timeline for a minimum processing time across each preemption indication 910 and each component carrier CC0-CC3. In this case, the minimum timeline may relate to a receive timing differential (RTD), a gap relating to the different timing advance groups, a UE capability relating to an amount of time to process the preemption indications (e.g., a single preemption indication, each of the preemption indications, and/or the like), and/or the like. As shown, UE 120 may determine whether a gap between a last received downlink preemption indication (e.g., preemption indication 910-0) and a first occurring symbol for preemption (e.g., a symbol of uplink grant 915-2) satisfies the minimum timeline for processing preemption indications. For example, when the gap satisfies the minimum timeline, then UE 120 may apply preemption to, for example, at least one symbol of uplink grant 915-2 and/or other symbols. Alternatively, when the gap does not satisfy the minimum timeline, UE 120 may not preempt the at least one symbol of uplink grant 915-2 and/or one or more other symbols.

In some aspects, UE 120 may evaluate the minimum timeline with regard to different timing advance groups rather than based at least in part on symbol indices. For example, preemption indication 910-0 is transmitted on CC0 indicating that a first set of symbols (e.g., symbols 2 and 3)

are to be preempted on CC0 and a second set of symbols (e.g., symbols 3 and 4) are to be preempted on CC1. In this case, CC/may be associated with TAG1, which may be transmitted earlier than CC0, which is associated with TAG0, thereby resulting in the second set of symbols occurring before the first set of symbols despite having symbol indices after the first set of symbols. As a result, UE 120 may be configured to determine whether the gap satisfies the minimum timeline across each timing advance group rather than based at least in part on symbol indices of the symbols, which may not identify which symbol is first across the timing advance groups. In this way, UE 120 avoids incorrectly determining that the gap satisfies the minimum timeline relative to another technique using only symbol indices.

In some aspects, UE 120 may determine whether to preempt a symbol on a per component carrier basis. For example, UE 120 may determine whether to preempt a symbol on component carrier CC0 based at least in part on the minimum timeline with regard to the preemption indication and uplink grant on CC0, and may determine whether to preempt another symbol on component carrier CC1 based at least in part on the minimum timeline with regard to the preemption indication and uplink grant on CC1. In this case, UE 120 may determine not to preempt a first symbol, and to preempt a second symbol. In some aspects, UE 120 may determine whether to preempt symbols associated with different subcarrier spacings. For example, UE 120 may determine whether to preempt a first symbol with a first subcarrier spacing on a first component carrier and whether to preempt a second symbol with a second subcarrier spacing on a second component carrier on a per component carrier basis (e.g., based at least in part on a timing of each respective component carrier rather than based at least in part on a first symbol for preemption). Alternatively, UE 120 may determine preemption based at least in part on the first symbol for preemption and not based at least in part on subcarrier spacing.

In some aspects, UE 120 may determine preemption for a downlink use case. For example, in a downlink scenario, an eMBB UE 120 may receive a preemption indication indicating that a set of symbols is punctured. In this case, the UE 120 may set log-likelihood ratios (LLRs) associated with the punctured symbols to zero, and may attempt decoding again. In some aspects, a time between the reception of a downlink preemption indication and an uplink transmission associated with a downlink shared channel (e.g., a DL PDSCH (i.e., PUCCH)) may satisfy a threshold amount of time for the UE 120 to start decoding.

As indicated above, FIG. 9 is provided as an example. Other examples may differ from what is described with respect to FIG. 9.

Figure 10:
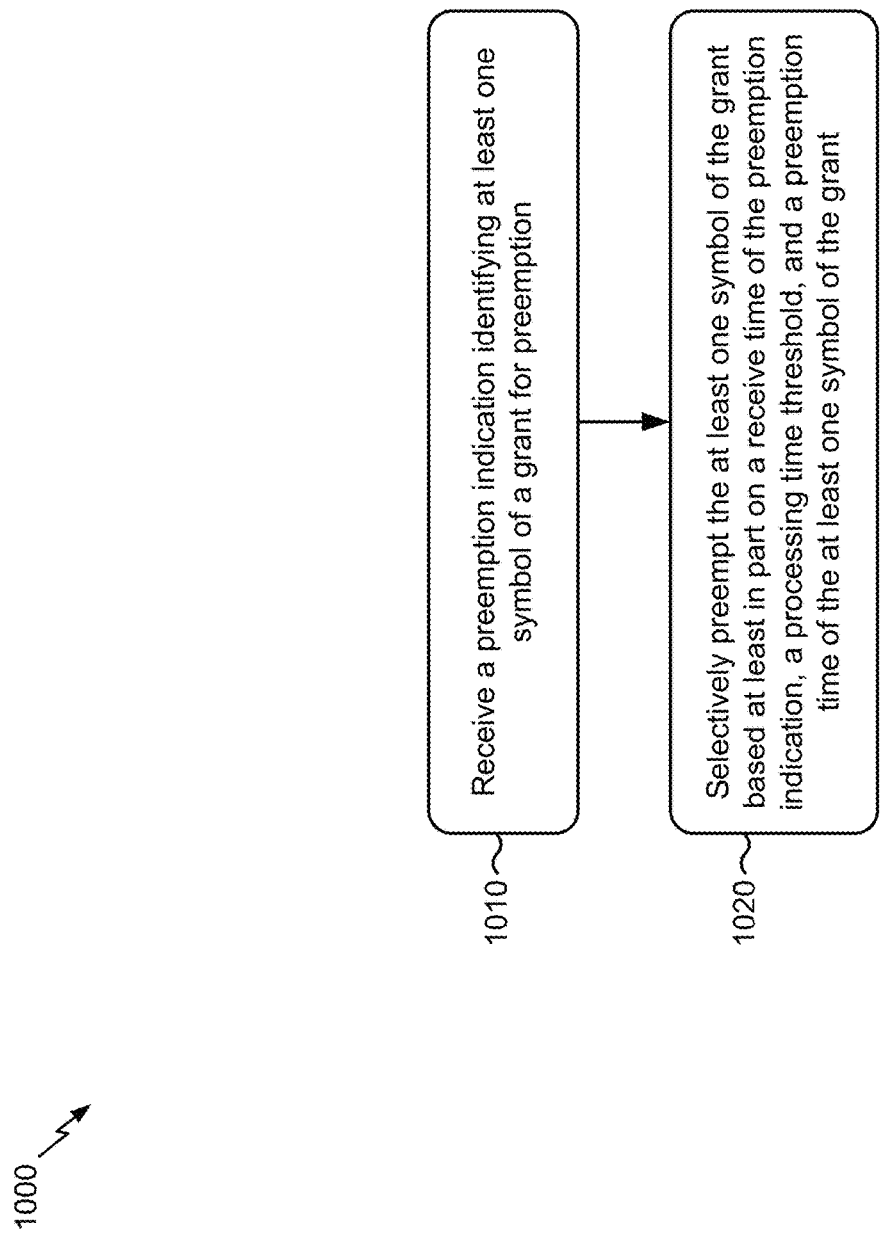
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs preemption indication management.

As shown in FIG. 10, in some aspects, process 1000 may include receiving a preemption indication identifying at least one symbol of a grant for preemption (block 1010). For example, the UE (e.g., using antenna 252, DEMOD 254, MIMO detector 256, receive processor 258, controller/processor 280, and/or the like) may receive the preemption indication identifying the at least one symbol of the grant for preemption, as described herein.

As shown in FIG. 10, in some aspects, process 1000 may include selectively preempting the at least one symbol of the grant based at least in part on a receive time of the preemption indication, a processing time threshold, and a preemption time of the at least one symbol of the grant (block 1020). For example, the UE (e.g., using controller/processor 240, transmit processor 220, TX MIMO processor 230, MOD 232, antenna 234, and/or the like) may selectively preempt the at least one symbol of the grant based at least in part on a receive time of the preemption indication, a processing time threshold, and a preemption time of the at least one symbol of the grant, as described herein.

Process 1000 may include additional aspects, such as any single aspect or any combination of aspects described below and/or in connection with one or more other processes described elsewhere herein.

In a first aspect, the UE is configured not to preempt the at least one symbol of the grant based at least in part on an amount of time between the receive time and the preemption time not satisfying the processing time threshold. In a second aspect, alone or in combination with the first aspect, the UE is configured to preempt the at least one symbol of the grant based at least in part on an amount of time between the receive time and the preemption time satisfying the processing time threshold. In a third aspect, alone or in combination with any one or more of the first and second aspects, the preemption indication is received on a particular component carrier and applies to a corresponding uplink component carrier and not to another uplink component carrier. In a fourth aspect, alone or in combination with any one or more of the first through second aspects, the preemption indication is received on a particular component carrier and applies to a plurality of uplink component carriers.

In a fifth aspect, alone or in combination with any one or more of the first through fourth aspects, the grant is associated with an uplink component carrier, of the plurality of uplink component carriers, the UE is configured to selectively preempt the at least one symbol of the grant based at least in part on the preemption time and the processing time threshold, and the UE is configured to selectively preempt another at least one symbol of another grant associated with another uplink component carrier, of the plurality of uplink component carriers, based at least in part on another preemption time for the other grant and the processing time threshold. In a sixth aspect, alone or in combination with any one or more of the first through fifth aspects, the grant is associated with an uplink component carrier, of the plurality of uplink component carriers, and the UE is configured to selectively preempt a plurality of symbols of a plurality of grants, including the at least one symbol of the grant, associated with the plurality of uplink component carriers based at least in part on the preemption time and the processing time threshold. In a seventh aspect, alone or in combination with any one or more of the first through sixth aspects, the preemption indication is a first preemption indication applying to a first uplink component carrier and a second preemption indication is received to apply to a second uplink component carrier.

In an eighth aspect, alone or in combination with any one or more of the first through seventh aspects, the UE is configured to selectively preempt the at least one symbol of the grant based at least in part on whether the processing time threshold is satisfied for the first preemption indication, and to selectively preempt another at least one symbol of another grant associated with the second preemption indication based at least in part on whether the processing time threshold is satisfied for the second preemption indication. In a ninth aspect, alone or in combination with any one or more of the first through eighth aspects, the UE is configured to selectively preempt the at least one symbol of the grant and another at least one symbol of another grant associated with the second preemption indication based at least in part on whether the processing time threshold is satisfied for a sequentially first symbol of a timing advance group that includes the at least one symbol and the other at least one symbol and a sequentially last receive time of preemption indications received on a component carrier on which the grant and first preemption indication and the second preemption indication are received.

In a tenth aspect, alone or in combination with any one or more of the first through ninth aspects, the UE is configured to selectively preempt the at least one symbol of the grant based at least in part on a minimum timeline criterion relating to a plurality of timing advance groups. In a eleventh aspect, alone or in combination with any one or more of the first through tenth aspects, the UE is configured to selectively preempt the at least one symbol of the grant based at least in part on at least one of a receive timing differential parameter, a UE capability, or a gap associated with a timing of a plurality of timing advance groups.

In a twelfth aspect, alone or in combination with any one or more of the first through eleventh aspects, the at least one symbol is a first symbol, and wherein the UE is configured to not preempt the first symbol based at least in part on whether the processing time threshold is satisfied for the first symbol and to not preempt a second symbol occurring after the first symbol based at least in part on whether the processing time threshold is satisfied for the first symbol. In a thirteenth aspect, alone or in combination with any one or more of the first through twelfth aspects, the at least one symbol is a first symbol, and the UE is configured to not preempt the first symbol based at least in part on whether the processing time threshold is satisfied for the first symbol, and to preempt a second symbol occurring after the first symbol based at least in part on whether the processing time threshold is satisfied for the second symbol.

In a fourteenth aspect, alone or in combination with any one or more of the first through thirteenth aspects, the at least one symbol is associated with a first component carrier and the UE is configured not to preempt the at least one symbol based at least in part on the processing time threshold, and the UE is configured to preempt another at least one symbol of another grant associated with another uplink component carrier and occurring after the at least one symbol based at least in part on another preemption time for the other at least one symbol and the processing time threshold. In a fifteenth aspect, alone or in combination with any one or more of the first through fourteenth aspects, the at least one symbol is associated with a first subcarrier spacing and a first component carrier, another at least one symbol is associated with a second subcarrier spacing and a second component carrier, and the UE is configured to determine whether to preempt the at least one symbol and the other at least one symbol on a per component carrier basis.

In a sixteenth aspect, alone or in combination with any one or more of the first through fifteenth aspects, the at least one symbol is associated with a first subcarrier spacing and a first component carrier and another at least one symbol is associated with a second subcarrier spacing and a second component carrier, and the UE is configured to determine whether to preempt the at least one symbol and the other at least one symbol based at least in part on a symbol of the at least one symbol and the other at least one symbol. In a seventeenth aspect, alone or in combination with any one or more of the first through sixteenth aspects, the at least one symbol is associated with a downlink communication, and the preemption indication indicates puncturing for the grant.

In an eighteenth aspect, alone or in combination with any one or more of the first through seventeenth aspects, the UE is configured to set at least one log-likelihood ratio based at least in part on the preemption indication. In a nineteenth aspect, alone or in combination with any one or more of the first through eighteenth aspects, the processing time threshold relates to a gap between reception of the preemption indication and an uplink transmission associated with a downlink shared channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a preemption indication identifying at least one symbol of a grant for preemption; and
selectively preempting the at least one symbol of the grant based at least in part on a receive time of the preemption indication, a processing time threshold, and a preemption time of the at least one symbol of the grant.

2. The method of claim 1, wherein the UE is configured not to preempt the at least one symbol of the grant based at least in part an amount of time between the receive time and the preemption time not satisfying the processing time threshold.

3. The method of claim 1, wherein the UE is configured to preempt the at least one symbol of the grant based at least in part on an amount of time between the receive time and the preemption time satisfying the processing time threshold.

4. The method of claim 1, wherein the preemption indication is received on a particular component carrier and applies to a corresponding uplink component carrier and not to another uplink component carrier.

5. The method of claim 1, wherein the preemption indication is received on a particular component carrier and applies to a plurality of uplink component carriers.

6. The method of claim 5, wherein the grant is associated with an uplink component carrier, of the plurality of uplink component carriers, and the UE is configured to selectively preempt the at least one symbol of the grant based at least in part on the preemption time and the processing time threshold, and
wherein the UE is configured to selectively preempt another at least one symbol of another grant associated with another uplink component carrier, of the plurality of uplink component carriers, based at least in part on another preemption time for the other grant and the processing time threshold.

7. The method of claim 5, wherein the grant is associated with an uplink component carrier, of the plurality of uplink component carriers, and the UE is configured to selectively preempt a plurality of symbols of a plurality of grants, including the at least one symbol of the grant, associated with the plurality of uplink component carriers based at least in part on the preemption time and the processing time threshold.

8. The method of claim 1, wherein the preemption indication is a first preemption indication applying to a first uplink component carrier and a second preemption indication is received to apply to a second uplink component carrier.

9. The method of claim 8, wherein the UE is configured to selectively preempt the at least one symbol of the grant based at least in part on whether the processing time threshold is satisfied for the first preemption indication and to selectively preempt another at least one symbol of another grant associated with the second preemption indication based at least in part on whether the processing time threshold is satisfied for the second preemption indication.

10. The method of claim 8, wherein the UE is configured to selectively preempt the at least one symbol of the grant and another at least one symbol of another grant associated with the second preemption indication based at least in part on whether the processing time threshold is satisfied for a sequentially first symbol of a timing advance group that includes the at least one symbol and the other at least one symbol and a sequentially last receive time of preemption indications received on a component carrier on which the grant and first preemption indication and the second preemption indication are received.

11. The method of claim 1, wherein the UE is configured to selectively preempt the at least one symbol of the grant based at least in part on a minimum timeline criterion relating to a plurality of timing advance groups.

12. The method of claim 1, wherein the UE is configured to selectively preempt the at least one symbol of the grant based at least in part on at least one of a receive timing differential parameter, a UE capability, or a gap associated with a timing of a plurality of timing advance groups.

13. The method of claim 1, wherein the at least one symbol is a first symbol, and wherein the UE is configured to not preempt the first symbol based at least in part on whether the processing time threshold is satisfied for the first symbol and not to preempt a second symbol occurring after the first symbol based at least in part on whether the processing time threshold is satisfied for the first symbol.

14. The method of claim 1, wherein the at least one symbol is a first symbol, and wherein the UE is configured to not preempt the first symbol based at least in part on whether the processing time threshold is satisfied for the first symbol and to preempt a second symbol occurring after the first symbol based at least in part on whether the processing time threshold is satisfied for the second symbol.

15. The method of claim 1, wherein the at least one symbol is associated with a first component carrier and the UE is configured not to preempt the at least one symbol based at least in part on the processing time threshold and the UE is configured to preempt another at least one symbol of another grant associated with another uplink component carrier and occurring after the at least one symbol based at least in part on another preemption time for the other at least one symbol and the processing time threshold.

16. The method of claim 1, wherein the at least one symbol is associated with a first subcarrier spacing and a first component carrier and another at least one symbol is associated with a second subcarrier spacing and a second component carrier, and
wherein the UE is configured to determine whether to preempt the at least one symbol and the other at least one symbol on a per component carrier basis.

17. The method of claim 1, wherein the at least one symbol is associated with a first subcarrier spacing and a first component carrier and another at least one symbol is associated with a second subcarrier spacing and a second component carrier, and
wherein the UE is configured to determine whether to preempt the at least one symbol and the other at least one symbol based at least in part on a symbol of the at least one symbol and the other at least one symbol.

18. The method of claim 1, wherein the at least one symbol is associated with a downlink communication, and
wherein the preemption indication indicates puncturing for the grant.

19. The method of claim 18, wherein the UE is configured to set at least one log-likelihood ratio based at least in part on the preemption indication.

20. The method of claim 18, wherein the processing time threshold relates to a gap between reception of the preemption indication and an uplink transmission associated with a downlink shared channel.

21. A user equipment (UE) for wireless communication, comprising:
a memory; and
one or more processors operatively coupled to the memory, the memory and the one or more processors configured to:
receive a preemption indication identifying at least one symbol of a grant for preemption; and
selectively preempt the at least one symbol of the grant based at least in part on a receive time of the preemption indication, a processing time threshold, and a preemption time of the at least one symbol of the grant.

22. The UE of claim 21, wherein the UE is configured not to preempt the at least one symbol of the grant based at least in part an amount of time between the receive time and the preemption time not satisfying the processing time threshold.

23. The UE of claim 21, wherein the UE is configured to preempt the at least one symbol of the grant based at least in part on an amount of time between the receive time and the preemption time satisfying the processing time threshold.

24. The UE of claim 21, wherein the preemption indication is received on a particular component carrier and applies to a corresponding uplink component carrier and not to another uplink component carrier.

25. A non-transitory computer-readable medium storing one or more instructions for wireless communication, the one or more instructions comprising:
one or more instructions that, when executed by one or more processors of a user equipment (UE), cause the one or more processors to:
receive a preemption indication identifying at least one symbol of a grant for preemption; and
selectively preempt the at least one symbol of the grant based at least in part on a receive time of the preemption indication, a processing time threshold, and a preemption time of the at least one symbol of the grant.

26. The non-transitory computer-readable medium of claim 25, wherein the UE is configured not to preempt the at least one symbol of the grant based at least in part an amount of time between the receive time and the preemption time not satisfying the processing time threshold.

27. The non-transitory computer-readable medium of claim 25, wherein the UE is configured to preempt the at least one symbol of the grant based at least in part on an amount of time between the receive time and the preemption time satisfying the processing time threshold.

28. An apparatus for wireless communication, comprising:
means for receiving a preemption indication identifying at least one symbol of a grant for preemption; and
means for selectively preempting the at least one symbol of the grant based at least in part on a receive time of the preemption indication, a processing time threshold, and a preemption time of the at least one symbol of the grant.

29. The apparatus of claim 28, wherein the UE is configured not to preempt the at least one symbol of the grant based at least in part an amount of time between the receive time and the preemption time not satisfying the processing time threshold.

30. The apparatus of claim 28, wherein the UE is configured to preempt the at least one symbol of the grant based at least in part on an amount of time between the receive time and the preemption time satisfying the processing time threshold.

* * * * *